United States Patent [19]

Douda et al.

[11] 4,260,509
[45] Apr. 7, 1981

[54] SOLVENT HAVING HIGH FLASH POINT

[75] Inventors: Bernard E. Douda, Bloomfield; Clyde F. Parrish, Terre Haute; James E. Short, Jr., Switz City, all of Ind.

[73] Assignee: The United States of America as represented by the Secretary of the Navy, Washington, D.C.

[21] Appl. No.: 109,692

[22] Filed: Jan. 4, 1980

[51] Int. Cl.³ ............... C11D 7/30; C23G 5/02
[52] U.S. Cl. ............................. 252/171; 252/162; 252/170; 252/364; 252/DIG. 8; 252/DIG. 9; 252/DIG. 10; 134/38; 134/40
[58] Field of Search ............... 252/170, 171, 162, 364, 252/DIG. 8, DIG. 9, DIG. 10; 134/38, 40, 22

[56] References Cited

U.S. PATENT DOCUMENTS

| | | | |
|---|---|---|---|
| 3,706,691 | 12/1972 | Duffy et al. | 134/38 X |
| 3,856,695 | 12/1974 | Geiss et al. | 134/38 X |
| 3,968,049 | 7/1976 | Lockett | 252/171 |

*Primary Examiner*—Mayer Weinblatt

[57] ABSTRACT

A high flash point solvent for dissolving a copolymer of vinylidene fluoride and hexafluoropropylene. The solvent is comprised of acetone, methylene chloride and either amyl acetate or butyl acetate.

8 Claims, No Drawings

SOLVENT HAVING HIGH FLASH POINT

BACKGROUND OF THE INVENTION

The present invention relates to a solvent which can effectively dissolve Viton-A, which is a trade name for a copolymer of vinylidene fluoride and hexafluoropropylene manufactured by E. I. du Pont, Inc.

The fluorelaster Viton-A is widely used in various classes of pyrotechnics and it is necessary to dispose of such pyrotechnic devices when they become old. Also, waste generated from the manufacture of such devices should be disposed, as storage of such material is both costly and hazardous.

In the past, one main disposal method for pyrotechnic material was to burn the material in an open buring-pit in a sparsely populated area. This burning method was particularly undesirable as it not only polluted the air with smoke but additionally the products of combustion creates a hazardous condition. Additionally, the scrap material had a high salvage value and the ingredients are well worth reclaiming.

Recently, various methods have been devised for recovering ingredients from pyrotechnic devices using Viton-A as a binder, and these methods generally include the steps of crushing the composition to form small chunks and then placing the chunks in acetone to dissolve the Viton-A. While acetone is the standard solvent used to dissolve Viton, its low flash point ($-18°$ C.) creates a severe flammability hazard.

SUMMARY OF THE INVENTION

The present invention provides an effective solvent for Viton-A and has a flash point sufficiently high to assure safe handling. A three-component system is provided and is comprised of acetone, methylene chloride and a third component which is either amyl acetate or butyl acetate. Various proportions of these components can be used and flash points in the range of 65 degrees F. to 95 degrees F. can be obtained.

It is therefore a general object of the present invention to provide a high flash point solvent for dissolving Viton-A.

Other objects, advantages, and novel features of the present invention will become apparent from the following detailed description of the invention.

DESCRIPTION OF THE PREFERRED EMBODIMENT

Viton-A, which is a fluorocarbon rubber, is produced by E. I. du Pont de Nemours Company and has the formula $(C_3H_2F_4)_x$, and is comprised of about 32.1 percent of carbon, about 1.8 percent of hydrogen and about 66.1 percent of florine.

An ideal solvent for Viton is one which dissolves it rapidly, has a high flash point, has a low boiling point, is relatively non-toxic and is reasonable in cost. A high flash point is required to minimize the flammability hazards and a low boiling point is desirable to aid in removing the solvent from the solid remains in a reclamation process.

The following examples are illustrative of the invention:

EXAMPLE I

| Ingredient | Percent by Volume |
| --- | --- |
| Acetone | 40 |
| Butyl Acetate | 40 |
| Methylene Chloride | 20 |

A cube of Viton-A weighing 1.964 grams was placed in 50 milliliters of the above-listed three component solvent and was stirred with a magnetic stirrer. Time was measured from start of mixing to time for last observable material to dissolve.

The 1.964 grams test piece and all other test pieces were cut so they would all have the shape of a cube. The surface of a cube is proportional to the mass to the two-thirds power and is pertinent as the rate of solution is proportional to the surface area. As it is extremely difficult to reproduce the exact sample weight for different test pieces, after a piece of Viton was cut, weighed and dissolved, the time for solution was compared to a calibration chart for a "corrected time" for solution. This calibration chart was obtained by plotting time for solution versus mass to the two-thirds power for a series of samples which were measured for the same conditions of temperature, sample shape and rate of stirring.

The 1.964 grams test piece was dissolved in the above-listed three component solvent in 1.5 hours and had a corrected time of 1.02 hours. The flash point of the solvent was 65° F.

EXAMPLE II

| Ingredient | Percent by Volume |
| --- | --- |
| Acetone | 30 |
| Butyl Acetate | 30 |
| Methylene Chloride | 40 |

A cube of Viton-A weighing 2.077 grams was cut, weighed and dissolved as described in EXAMPLE I and was dissolved in 2.5 hours and had a corrected time of 1.67 hours. The flash point of the solvent was 65° F.

EXAMPLE III

| Ingredient | Percent by Volume |
| --- | --- |
| Acetone | 20 |
| Butyl Acetate | 60 |
| Methylene Chloride | 20 |

A cube of Viton-A weighing 2.317 grams was cut, weighed and dissolved as described in EXAMPLE I and was dissolved in 2.0 hours and had a corrected time of 1.11 hours. The flash point of the solvent was 65° F.

EXAMPLE IV

| Ingredient | Percent by Volume |
| --- | --- |
| Acetone | 10 |
| Butyl Acetate | 70 |
| Methylene Chloride | 20 |

A cube of Viton-A weighing 2.4571 grams was cut, weighed and dissolved as described in EXAMPLE I and was dissolved in 2.5 hours and had a corrected time of 1.31 hours. The flash point of the solvent was 85° F.

EXAMPLE V

| Ingredient | Percent by Volume |
|---|---|
| Acetone | 20 |
| Amyl Acetate | 40 |
| Methylene Chloride | 40 |

A cube of Viton-A weighing 1.114 grams was cut, weighed and dissolved as described in EXAMPLE I and was dissolved in 2.5 hours and had a corrected time of 3.2 hours. The flash point of the solvent was 95° F.

EXAMPLE VI

| Ingredient | Percent by Volume |
|---|---|
| Acetone | 20 |
| Amyl Acetate | 50 |
| Methylene Chloride | 30 |

A cube of Viton-A weighing 1.2 grams was cut, weighed and dissolved as described in EXAMPLE I and was dissolved in 1.5 hours and had a corrected time of 1.6 hours. The flash point of the solvent was 80° F.

EXAMPLE VII

| Ingredient | Percent by Volume |
|---|---|
| Acetone | 10 |
| Amyl Acetate | 70 |
| Methylene Chloride | 20 |

A cube of Viton-A weighing 1.459 grams was cut, weighed and dissolved as described in EXAMPLE I and was dissolved in 2.0 hours and had a corrected time of 1.88 hours. The flash point of the solvent was 75° F.

In the above-listed examples, flash point, which is the temperature at which the saturated vapors will ingnite when exposed to a flame or a spark, was determined using a closed cup method.

It can thus be seen that the present invention provides a solvent which will dissolve Viton-A in a reasonably short period of time and that the hazard of flammability has been greatly reduced.

Obviously many modifications and variations of the present invention are possible in the light of the above teachings. It is therefore to be understood that the invention may be practiced otherwise than as specifically described.

We claim:

1. A high flash point solvent for dissolving a copolymer of vinylidene fluoride and hexafluoropropylene consisting of volume,
   between 10 and 40 percent of acetone,
   between 20 and 40 percent of methylene chloride, and
   between 30 and 70 percent of an acetate selected from the group consisting of amyl acetate and butyl acetate.

2. A high flash point solvent for dissolving a copolymer of vinylidene fluroide and hexafluoropropylene as set forth in claim 1 wherein the flash point of said solvent is in the range of from about 65 degrees F. to about 95 degrees F.

3. A high flash point solvent for dissolving a copolymer of vinylidene fluoride and hexafluoropropylene as set forth in claim 1 wherein said acetate is amyl acetate.

4. A high flash point solvent for dissolving a copolymer of vinylidene fluoride and hexafluoropropylene as set forth in claim 1 wherein said acetate is butyl acetate.

5. A high flash point solvent for dissolving a copolymer of vinylidene fluoride and hexafluoropropylene consisting of, by volume,
   about 10 percent of acetone,
   about 70 percent of butyl acetate, and
   about 20 percent of methylene chloride.

6. A high flash point solvent for dissolving a copolymer of vinylidene fluoride and hexafluoropropylene as set forth in claim 5 wherein the flash point of said solvent is about 85 degrees F.

7. A high flash point solvent for dissolving a copolymer of vinylidene fluoride and hexafluoropropylene consisting of by volume,
   about 20 perecent of acetone,
   about 50 percent of amyl acetate, and
   about 30 percent of methylene chloride.

8. A high flash point solvent for dissolving a copolymer of vinylidene fluoride and hexafluoropropylene as set forth in claim 7 wherein the flash point of said solvent is about 80 degrees F.

* * * * *